_United States Patent Office_

3,054,655
Patented Sept. 18, 1962

3,054,655
PROCESS FOR SEPARATING RARE EARTHS AND YTTRIUM BY ION EXCHANGE
Pawel Krumholz, Rua Maestro Elias Lobo 241, Sao Paulo, Brazil, and Kasimierz Josef Bril, Rua 4, No. 89 Jardim Elvira, Santo Amaro, Sao Paulo, Brazil
No Drawing. Filed Aug. 19, 1958, Ser. No. 755,891
Claims priority, application Brazil Sept. 2, 1957
10 Claims. (Cl. 23—23)

The hitherto most efficient method for separating mixtures of rare earths consists in eluting a band of rare earths adsorbed on an ion exchange resin through a second ion exchange bed in the copper state. This method however has the great disadvantage, that the recovery of the eluting agent ethylenediamine tetraacetic acid, represents serious technical and economical difficulties. Acidification of solutions containing the copper complex of ethylenediamine tetraacetic acid permits only a very low recovery of the complexing agent, highly contaminated with copper. Reasonable yields can be obtained only if copper is removed prior to the precipitation of ethylenediamine tetraacetic acid. It has been stated, that besides copper, iron, nickel and lead could serve as retaining agents of the rare earths ions. The stabilities of the ethylenediamine tetraacetic acid complexes of most of the other ions were thought to be too small to permit their use as retaining agents. It has been stated for instance, that zinc elutes from a resin bed charged with a mixture of that ion with rare earths, between neodymium and samarium, if ethylenediamine tetraacetic acid is used as eluting agent. We found contrary to that statement that zinc elutes before yttrium and gadolinium and leaves a column together with the heavy earths, particularly holmium. Cadmium behaves quite similary to zinc. We found, and it is the principal object of this invention, that by using zinc or cadmium as retaining agents excellent separations of rare earths and of yttrium may be achieved. We found, furthermore, that such separations are very efficient not only for those rare earths which are eluted after the zinc, that is where zinc functions as a full retaining agent. Contrary thereto, separations are specially efficient for those elements, which are eluted together with the zinc or cadmium, that is for the rare earths heavier than dysprosium. At least for the separation of those elements the mode of action of zinc or cadmium is quite different from that of copper. The great advantage of using zinc or cadmium instead of copper consists in the fact that the zinc and cadmium complexes of ethylenediamine tetraacetic acid are easily decomposed by acidification and thus the complexing agent can be recovered with an excellent yield. This fact reflects, of course, greatly on the economy of the separations.

According to the present invention, the separation of mixture of rare earths and yttrium is performed in such a way, that the mixture is adsorbed on an ion exchange bed and thereafter eluted with a solution of a suitable eluting agent, for instance, ethylenediamine tetraacetic acid, through a second ion exchange bed in the zinc or cadmium form. It is an advantage and an object of this invention, to use as first ion exchange bed a bed of sufficient length, to achieve the best possible separation in this first step. For the same reason, it is advantageous and another object of this invention, to saturate this first bed not completely, but only to 80% to 95% of its capacity. The length of the resin bed in the zinc or cadmium state may be varied, depending on the type of separation to be performed, between a fraction and several times the length of the first resin bed. Any suitable ion exchange resin may be used, but preferentially a sulfonated polystyrene-divinylbenzene copolymer. We found, and it is another object of this invention, that separations are best if resins of a low cross-linkage, preferably around 4% are used for both resin beds.

Alternatively, and it is another object of this invention, a mixture of rare earths, yttrium and zinc or cadmium salts may be charged on one resin bed and thereafter eluted with the complexing or chelating agent. The zinc or cadmium distributes itself partly over the whole length of the column but concentrates mostly at its lower end. Separation efficiencies are similiar to those obtained in the first alternative. This method is particularly valuable, where the amount of zinc or cadmium used is only a fraction of the quantity of the rare earths.

If ethylenediamine tetraacetic acid is used as eluting agent, concentrations as high as 30 g. per liter may be used. The eluting solutions contain alkali or ammonium salts of ethylenediamine tetraacetic acid and are adjusted to a pH between 8 and 9. Flow rate as high as one inch per minute may be used permitting very high production capacities per unit of resin installed.

Ethylenediamine tetraacetic acid is recovered from the eluates according to this invention by adding sufficient hydrochloric, nitric or sulfuric acid to maintain an excess of at least 0.07 mole per liter, agitating during 8 to 16 hours and separating the precipitated acid by filtration. Rare earths and yttrium may be recovered by any suitable means, for instance precipitation of hydroxide, carbonates, oxalates or fluorides. Alternatively, the filtrates may be recharged on another column system and submitted to a refractionation. According to this invention, the solutions freed from most of their ethylenediamine tetraacetic acid content are brough to a pH of 1.5 or higher, prior to the adsorption on a resin bed. Under such conditions adsorption of rare earths and yttrium ions is complete even in the presence of small quantities of ethylenediamine tetraacetic acid. Intermediate fractions may, and it is another object of this invention, be returned to the original feed.

Whereas the efficiency of the new process is demonstrated on the special example of ethylenediamine tetraacetic acid as eluting agent, our invention is by no means limited to the use of this special agent. Any other complexing agent like nitrilotriacetic acid, hydroxyethylenediamine triacetic acid, diethylenetriamine pentaacetic acid, diaminocyclohexane tetraacetic acid may be substituted for ethylenediamine tetraacetic acid.

The following examples illustrate the new process.

EXAMPLE I

An ion exchange column of 4 inches diameter and 4 feet height filled with a —50+100 mesh sulfonated polystyrene-divinylbenzene copolymer with 4% cross-linkage was charged to 95% of its total capacity with a rare earths-yttrium mixture whose composition is indicated in Table I. A second ion exchange column of 4 inches diameter and 8 feet height filled with the same resin was charged with a solution of zinc sulphate until completely saturated. Thereafter the columns were eluted with a solution containing 2% ethylenediamine tetracetic acid as ammonium salts, having a pH of 8.45 and heated to 30° at a rate of 10 liters per hour. The elution was performed in such way that the eluting agent first passed through the column charged with the rare earths mixture and then through the zinc column. The total amount of rare earths and yttrium oxides charged on the first column was 540 g. and the amount of zinc oxide charge on the second colmn 1100 g. Successive fractions of the eluate were collected and analysed for their rare earths content and composition. The results of this experiment are shown in Table I.

Table I

| Percent $R_2O_3$ eluted | Percent ZnO eluted | $Yb_2O_3$ | $Tm_2O_3$ | $Er_2O_3$ | $Ho_2O_3$ | $Dy_2O_3$ | $Y_2O_3$ |
|---|---|---|---|---|---|---|---|
| 0.97 | 5.9 | 85 | 6.5 | 1.5 | ---- | ---- | ---- |
| 1.21 | 7.5 | 45 | 25 | 27.5 | ---- | ---- | ---- |
| 1.25 | 7.6 | 3 | 10 | 87 | ---- | ---- | ---- |
| 1.51 | 7.1 | ---- | 1.2 | 98 | <0.5 | ---- | ---- |
| 1.07 | 8.2 | ---- | ---- | 97.5 | 2.5 | ---- | ---- |
| 0.43 | 6.8 | ---- | ---- | 76 | 23 | ---- | ---- |
| 0.32 | 7.0 | ---- | ---- | 23 | 77 | ---- | ---- |
| 0.46 | 7.4 | ---- | ---- | 4.5 | 95 | <0.5 | ---- |
| 0.66 | 7.1 | ---- | ---- | 1 | 97 | 2 | ---- |
| 0.60 | 7.5 | ---- | ---- | 0.4 | 76 | 22 | 2 |
| 0.95 | 6.8 | ---- | ---- | ---- | 17 | 78 | 5 |
| 2.13 | 6.3 | ---- | ---- | ---- | 1 | 90 | 9 |
| 3.25 | 5.2 | ---- | ---- | ---- | ---- | 87 | 13 |
| 3.9 | 5.2 | ---- | ---- | ---- | ---- | 73 | 27 |
| 5.8 | 3.2 | ---- | ---- | ---- | ---- | 34 | 66 |
| 12.7 | 0.2 | ---- | ---- | ---- | ---- | 3.5 | 96.5 |
| 62.8 | --- | ---- | ---- | ---- | ---- | <0.2 | 99.8 |
| 100 | --- | 1.4 | 0.5 | 4.4 | 2.1 | 11 | 80.5 |

EXAMPLE II

The experiment performed in this example is similar to that reported in Example I with the difference that both columns had a length of 8 feet. The total amount of rare earths and yttrium oxides charged on the first column was 1030 g. and the amount of zinc oxide charged on the second column was 1070 g. The corresponding data are shown in Table II.

Table II

| Percent $R_2O_3$ eluted | Percent ZnO eluted | $Yb_2O_3$ | $Tm_2O_3$ | $Er_2O_3$ | $Ho_2O_3$ | $Dy_2O_3$ | $Y_2O_3$ |
|---|---|---|---|---|---|---|---|
| 0.97 | 4.7 | 82 | 6.5 | 5.5 | ---- | ---- | ---- |
| 1.21 | 6.5 | 68 | 15 | 13.5 | ---- | ---- | ---- |
| 1.58 | 11 | 10 | 16.5 | 71 | 0.5 | ---- | ---- |
| 2.1 | 9.8 | ---- | 2.5 | 95.5 | 2 | ---- | ---- |
| 1.05 | 6.7 | ---- | ---- | 89 | 10 | ---- | ---- |
| 0.47 | 6.7 | ---- | ---- | 47 | 52 | 1 | ---- |
| 1.27 | 19.5 | ---- | ---- | 3 | 90 | 6 | 1 |
| 0.45 | 5.2 | ---- | ---- | ---- | 68 | 28 | 4 |
| 0.40 | 5.6 | ---- | ---- | ---- | 42 | 50 | 8 |
| 1.62 | 13.2 | ---- | ---- | ---- | 6 | 78 | 16 |
| 3.15 | 9.3 | ---- | ---- | ---- | ---- | 80 | 20 |
| 6.1 | 1.7 | ---- | ---- | ---- | ---- | 50 | 50 |
| 6.0 | ---- | ---- | ---- | ---- | ---- | 21 | 79 |
| 6.0 | ---- | ---- | ---- | ---- | ---- | 17 | 83 |
| 6.0 | ---- | ---- | ---- | ---- | ---- | ---- | 88 |
| 5.8 | ---- | ---- | ---- | ---- | ---- | 8 | 92 |
| 5.7 | ---- | ---- | ---- | ---- | ---- | 5 | 95 |
| 5.7 | ---- | ---- | ---- | ---- | ---- | 2 | 98 |
| 45 | ---- | ---- | ---- | ---- | ---- | <0.2 | 99.8 |
| 100 | ---- | 1.55 | 0.55 | 4.5 | 2.1 | 11.2 | 80 |

EXAMPLE III

The experiment described in this example is similar to that reported in Example I with the difference that the column charged with the rare earths mixture had a length of 8 feet and the column charged with zinc a length of 4 feet. The total amount of rare earths and yttrium oxides charged on the first column was 1000 g. and the amount of zinc oxide charged on the second column 535 g. The corresponding data are shown in Table III.

Table III

| Percent $R_2O_3$ eluted | Percent ZnO eluted | $Yb_2O_3$ | $Tm_2O_3$ | $Er_2O_3$ | $Ho_2O_3$ | $Dy_2O_3$ | $Y_2O_3$ |
|---|---|---|---|---|---|---|---|
| 0.75 | 4.4 | 75 | 8 | 10 | ---- | ---- | ---- |
| 1.67 | 10.1 | 55 | 14.5 | 25 | <0.5 | ---- | ---- |
| 1.75 | 14.0 | 8 | 12.5 | 77 | 2.5 | ---- | ---- |
| 2.1 | 14.0 | ---- | 2 | 86 | 8.5 | 3 | ---- |
| 1.0 | 7.8 | ---- | ---- | 74 | 20 | 6 | ---- |
| 0.56 | 6.3 | ---- | ---- | 46 | 42 | 12 | ---- |
| 0.73 | 9.4 | ---- | ---- | 12.5 | 52 | 24 | 11 |
| 1.4 | 12.2 | ---- | ---- | 1.5 | 39 | 35 | 24 |
| 1.0 | 7.1 | ---- | ---- | ---- | 26 | 38 | 36 |
| 1.88 | 8.2 | ---- | ---- | ---- | 16 | 39 | 45 |
| 3.16 | 5.7 | ---- | ---- | ---- | 4.5 | 42 | 53 |
| 3.04 | 0.5 | ---- | ---- | ---- | 0.7 | 28 | 71 |
| 3.17 | ---- | ---- | ---- | ---- | 0.2 | 22 | 78 |
| 78 | ---- | ---- | ---- | ---- | <0.02 | 7 | 93 |
| 100 | ---- | 1.6 | 0.6 | 4.8 | 2.4 | 10.3 | 80.3 |

EXAMPLE IV 1100 g. of the rare earths and yttrium oxide mixture used in Examples I to III were dissolved in sulfuric acid and brought to a concentration of 13 g. total oxides per liter. To the solution was added a solution of zinc sulfate containing a total of 400 g. of zinc oxide. The mixed solution was passed through an ion exchange column of 4 inches diameter and 11 feet length filled with a —50 +100 mesh sulfonated polystyrene divinylbenzene copolymer of 4% crosslinkage. The column was washed wit water to remove any excess of zinc and thereafter eluted with a solution containing 2% of ethylenediamine tetraacetic acid as ammonium salt, adjusted to a pH of 8.6 and heated to 35°, at a rate of 12 liters per hour. Successive fractions of the eluate were collected and analysed for their rare earths content and composition. The corresponding data are shown in Table IV.

Table IV

| Percent $R_2O_3$ eluted | Percent ZnO eluted | $Yb_2O_3$ | $Tm_2O_3$ | $Er_2O_3$ | $Ho_2O_3$ | $Dy_2O_3$ | $Y_2O_3$ |
|---|---|---|---|---|---|---|---|
| 0.77 | 3.75 | 80 | 7.5 | 3 | ---- | ---- | ---- |
| 1.24 | 6.85 | 55 | 14 | 26 | 0.5 | ---- | ---- |
| 1.33 | 9.6 | 5 | 15 | 75 | 2.5 | ---- | ---- |
| 1.54 | 10.8 | ---- | 3 | 86 | 8 | 2 | ---- |
| 1.44 | 15.2 | ---- | 0.5 | 78 | 17.5 | 3.5 | ---- |
| 1.07 | 21.4 | ---- | ---- | 32 | 42.5 | 24 | 5 |
| 1.37 | 17.2 | ---- | ---- | 2 | 36.5 | 34 | 27.5 |
| 2.9 | 13.3 | ---- | ---- | ---- | 19 | 87 | 44 |
| 7.4 | 0.8 | ---- | ---- | ---- | 3 | 26 | 71 |
| 7.5 | ---- | ---- | ---- | ---- | 0.4 | 22 | 78 |
| 7.5 | ---- | ---- | ---- | ---- | 0.06 | 21 | 79 |
| 66 | ---- | ---- | ---- | ---- | <0.02 | 7 | 93 |
| 100 | ---- | 1.4 | 0.5 | 4.1 | 2.2 | 11.6 | 80.2 |

EXAMPLE V

A concentrate of heavy rare earths of the composition indicated in Table V was charged on an ion exchange column of 4 inches diameter and 4 feet length filled with a —50 +100 mesh sulfonated polystyrene divinylbenzene copoylmer with 4% crosslinkage. The column was eluted with a solution containing 2% of ethylenediamine tetraacetic acid as ammonium salts, adjusted to a pH of 8.4 and heated to 30°, at a velocity of 10 liters per hour, through a second column in the zinc form. The total amount of the rare earths oxides charged on the first column was 610 g. and the amount of zinc oxide on the second column 580. Successive fractions of the eluate were collected and analysed for their rare earths content and composition. The corresponding data are shown in Table V.

Table V

| Percent $R_2O_3$ eluted | Percent ZnO eluted | $Yb_2O_3$ | $Tm_2O_3$ | $Er_2O_3$ | $Ho_2O_3$ | $Dy_2O_3$ | $Y_2O_3$ |
|---|---|---|---|---|---|---|---|
| 2.28 | 5.3 | 85 | 6 | 3 | ---- | ---- | ---- |
| 6.72 | 10 | 80 | 7 | 8 | ---- | ---- | ---- |
| 6.8 | 9.4 | 74 | 11 | 15 | ---- | ---- | ---- |
| 5.32 | 11.8 | 25 | 40 | 35 | ---- | ---- | ---- |
| 4.6 | 8.9 | 4 | 34 | 62 | ---- | ---- | ---- |
| 3.06 | 5.6 | ---- | 13 | 87 | ---- | ---- | ---- |
| 7.44 | 12 | ---- | 3 | 97 | ---- | ---- | ---- |
| 18.3 | 22 | ---- | ---- | >99 | <1 | ---- | ---- |
| 5.45 | 6 | ---- | ---- | 98 | 2 | ---- | ---- |
| 3.8 | 2.6 | ---- | ---- | 93 | 6.5 | ---- | ---- |
| 3.95 | 2.5 | ---- | ---- | 81 | 16 | ---- | ---- |
| 5.25 | 2.5 | ---- | ---- | 48 | 43 | 7 | 2 |
| 7.05 | 1.5 | ---- | ---- | 7 | 63 | 19 | 11 |
| 6.87 | 0.3 | ---- | ---- | ---- | 15.5 | 62 | 22 |
| 5.05 | ---- | ---- | ---- | ---- | 0.5 | 22 | 77 |
| 4.54 | ---- | ---- | ---- | ---- | 1.5 | 1.5 | 98 |
| 3.75 | ---- | ---- | ---- | ---- | ---- | <0.1 | 99.9 |
| 100 | ---- | 13.7 | 5.7 | 49.5 | 9.3 | 7.2 | 14.5 |

EXAMPLE VI

The experiment described in this example is similar to that reported in Example V with the difference that the original oxides represented a mixture of lanthanum oxide, praseodymium oxide and neodymium oxide. The total amount of rare earths oxides charged on the first column was 740 g. and that of zinc oxide on the second column 510 g. Successive fractions of the eluate were collected and analysed for their rare earths content and composition. The corresponding data are shown in Table VI.

*Table VI*

| Percent R₂O₃ eluted | SM₂O₂ | Nd₂O₃ | Pr₂O₃ | La₂O₃ |
|---|---|---|---|---|
| 0.64 | 35 | 35 | ----- | ------ |
| 1.45 | 22 | 68 | ----- | ------ |
| 3.6 | 3.5 | 96 | ----- | ------ |
| 16.0 | 0.2 | 99.5 | 0.2 | ------ |
| 4.15 | ---- | 98.5 | 1.5 | ------ |
| 8.6 | ---- | 95 | 5 | ------ |
| 4.25 | ---- | 88 | 12 | ------ |
| 7.85 | ---- | 60 | 38 | 2 |
| 3.65 | ---- | 27 | 69 | 4 |
| 3.65 | ---- | 9 | 85 | 6 |
| 2.83 | ---- | 1 | 86 | 13 |
| 3.18 | ---- | 0.1 | 68 | 32 |
| 3.4 | ---- | ---- | 38 | 62 |
| 3.4 | ---- | ---- | 18 | 82 |
| 3.3 | ---- | ---- | 2.5 | 97.5 |
| 30.6 | ---- | ---- | <0.1 | >99.9 |
| 100 | 0.7 | 42.5 | 16.3 | 40.5 |

What is claimed is:

1. A method of separating rare earth metals and yttrium from each other by ion exchange, comprising the steps of contacting an aqueous solution containing rare earth metal and yttrium ions with a first ion exchange resin adapted to adsorb said ions, thereby charging said ion exchange resin with adsorbed rare earth metal and yttrium ions; passing a solution of a complexing agent adapted to form complexes with said rare earths and yttrium and being selected from the group consisting of ethylenediamine tetraacetic acid, alkali metal and ammonium salts of ethylenediamine tetraacetic acid, nitrilotriacetic acid, hydroxyethylenediamine triacetic acid, diethylenetriamine pentaacetic acid and diaminocyclohexane tetraacetic acid through said charged first ion exchange resin so as to form a first eluate containing complexes of said complexing agent and said rare earth metals and yttrium; passing said first eluate through a second ion exchange resin charged with lower metal ions selected from the group consisting of zinc and cadmium ions so as to form lower metal complexes of said lower metal ions and said complexing agent, thereby forming a second eluate containing said lower metal complexes of said lower metal ions and said complexing agents and said rare earths and yttrium complexes; and collecting successive portions of said second eluate so as to separately obtain the individual rare earths and yttrium and said lower metal complexes.

2. A method of separating rare earth metals and yttrium from each other by ion exchange, comprising the steps of contacting an aqueous solution containing rare earth metal and yttrium ions with a first ion exchange resin adapted to adsorb said ions until said ion exchange resin has adsorbed at least 80% of its capacity of said rare earth metal and yttrium ions, thereby charging said ion exchange resin with adsorbed rare earth metal and yttrium ions; passing a solution of a complexing agent adapted to form complexes with said rare earths and yttrium and being selected from the group consisting of ethylenediamine tetraacetic acid, alkali metal and ammonium salts of ethylenediamine tetraacetic acid, nitrilotriacetic acid, hydroxyethylenediamine triacetic acid, diethylenetriamine pentaacetic acid and diaminocyclohexane tetraacetic acid through said charged first ion exchange resin so as to form a first eluate containing complexes of said complexing agent and said rare earth metals and yttrium; passing said first eluate through a second ion exchange resin charged with lower metal ions selected from the group consisting of zinc and cadmium ions so as to form lower metal complexes of said lower metal ions and said complexing agent, thereby forming a second eluate containing said lower metal complexes of said lower metal ions and said complexing agents and said rare earths and yttrium complexes; and collecting successive portions of said second eluate so as to separately obtain the individual rare earths and yttrium and said lower metal complexes.

3. A method of separating rare earth metals and yttrium from each other by ion exchange, comprising the steps of contacting an aqueous solution containing rare earth metal and yttrium ions with a first ion exchange resin adapted to adsorb said ions until said ion exchange resin has adsorbed between 80 and 95% of its capacity of said rare earth metal and yttrium ions, thereby charging said ion exchange resin with adsorbed rare earth metal and yttrium ions; passing a solution of a complexing agent adapted to form complexes with said rare earths and yttrium and being selected from the group consisting of ethylenediamine tetraacetic acid, alkali metal and ammonium salts of ethylenediamine tetraacetic acid, nitrilotriacetic acid, hydroxyethylenediamine triacetic acid, diethylenetriamine pentaacetic acid and diaminocyclohexane tetraacetic acid through said charged first ion exchange resin so as to form a first eluate containing complexes of said complexing agent and said rare earth metals and yttrium; passing said first eluate through a second ion exchange resin charged with lower metal ions selected from the group consisting of zinc and cadmium ions so as to form lower metal complexes of said lower metal ions and said complexing agent, thereby forming a second eluate containing said lower metal complexes of said lower metal ions and said complexing agents and said rare earths and yttrium complexes; and collecting successive portions of said second eluate so as to separately obtain the individual rare earths and yttrium and said lower metal complexes.

4. A method of separating rare earth metals and yttrium from each other by ion exchange, comprising the steps of contacting an aqueous solution containing rare earth metal and yttrium ions with a sulfonated polystyrenedivinylbenzene copolymer as a first ion exchange resin adapted to adsorb said ions, thereby charging said ion exchange resin with adsorbed rare earth metal and yttrium ions; passing a solution of a complexing agent adapted to form complexes with said rare earths and yttrium and being selected from the group consisting of ethylenediamine tetraacetic acid, alkali metal and ammonium salts of ethylenediamine tetraacetic acid, nitrilotriacetic acid, hydroxyethylenediamine triacetic acid, diethylenetriamine pentaacetic acid and diaminocyclohexane tetraacetic acid through said charged first ion exchange resin so as to form a first eluate containing complexes of said complexing agent and said rare earth metals and yttrium; passing said first eluate through a second ion exchange resin charged with lower metal ions selected from the group consisting of zinc and cadmium ions so as to form lower metal complexes of said lower metal ions and said complexing agent, thereby forming a second eluate containing said lower metal complexes of said lower metal ions and said complexing agents and said rare earths and yttrium complexes; and collecting successive portions of said second eluate so as to separately obtain the individual rare earths and yttrium and said lower metal complexes.

5. A method of separating rare earth metals and yttrium from each other by ion exchange, comprising the steps of contacting an aqueous solution containing rare earth metal and yttrium ions with a sulfonated polystyrenedivinylbenzene copolymer of approximately 4% cross linkage as a first ion exchange resin adapted to adsorb said ions, thereby charging said ion exchange resin with adsorbed rare earth metal and yttrium ions; passing a solution of a complexing agent adapted to form complexes with said rare earths and yttrium and being selected from the group consisting of ethylenediamine tetraacetic acid, alkali metal and ammonium salts of ethylenediamine tetraacetic acid, nitrilotriacetic acid, hydroxyethylenediamine triacetic acid, diethylenetriamine pentaacetic acid and diaminocyclohexane tetraacetic acid through said charged first ion exchange resin so as to form a first eluate containing complexes of said complexing agent and said rare earth metals and yttrium; passing said first eluate through a second ion exchange resin charged with lower metal ions selected from the group consisting of zinc and cadmium ions so as to form lower metal complexes of said lower metal ions and said complexing agent, thereby forming a second eluate containing said lower metal complexes of said lower metal ions and said complexing agents and said rare earths and yttrium complexes; and collecting successive portions of said second eluate so as to separately obtain the individual rare earths and yttrium and said lower metal complexes.

6. A method of separating rare earth metals and yttrium from each other by ion exchange, comprising the steps of contacting an aqueous solution containing rare earth metal and yttrium ions with a first ion exchange resin adapted to adsorb said ions, thereby charging said ion exchange resin with adsorbed rare earth metal and yttrium ions; passing an aqueous solution of a complexing agent adapted to form complexes with said rare earths and yttrium and being selected from the group consisting of ethylenediamine tetraacetic acid, alkali metal and ammonium salts of ethylenediamine tetraacetic acid, nitrilotriacetic acid, hydroxyethylenediamine triacetic acid, diethylenetriamine pentaacetic acid, diaminocyclohexane tetraacetic acid, said aqueous solution having a pH of 8–9, through said charged ion exchange resin so as to form a first eluate containing complexes of said complexing agent and said rare earth metals and yttrium; passing said first eluate through a second ion exchange resin charged with lower metal ions selected from the group consisting of zinc and cadmium ions so as to form lower metal complexes of said lower metal ions and said complexing agent, thereby forming a second eluate containing said lower metal complexes of said lower metal ions and said complexing agents and said rare earths and yttrium complexes; and collecting successive portions of said second eluate so as to separately obtain the individual rare earths and yttrium and said lower metal complexes.

7. A method of separating rare earth metals and yttrium from each other by ion exchange, comprising the steps of contacting an aqueous solution containing rare earth metal and yttrium ions with a first ion exchange resin adapted to adsorb said ions, thereby charging said ion exchange resin with adsorbed rare earth metal and yttrium ions; passing an aqueous solution of ethylenediamine tetraacetic acid as complexing agent, said aqueous solution having a pH of 8–9, through said charged ion exchange resin so as to form a first eluate containing complexes of said complexing agent and said rare earth metals and yttrium; passing said first eluate through a second ion exchange resin charged with lower metal ions selected from the group consisting of zinc and cadmium ions so as to form lower metal complexes of said lower metal ions and said complexing agent, thereby forming a second eluate containing said lower metal complexes of said lower metal ions and said complexing agents and said rare earths and yttrium complexes; collecting successive portions of said second eluate so as to separately obtain the individual rare earths and yttrium and said lower metal complexes; acidifying the portion of said second eluate containing said lower metal complexes with an excess of a mineral acid selected from the group consisting of sulfuric acid, hydrochloric acid and nitric acid so as to precipitate said complexing agent therefrom; and recovering said precipitated complexing agent.

8. A method of separating rare earth metals and yttrium from each other by ion exchange, comprising the steps of contacting an aqueous solution containing rare earth metal and yttrium ions with a first ion exchange resin adapted to adsorb said ions, thereby charging said ion exchange resin with adsorbed rare earth metal and yttrium ions; passing an aqueous solution of an alkali metal salt of ethylenediamine tetraacetic acid as complexing agent, said aqueous solution having a pH of 8–9, through said charged ion exchange resin so as to form a first eluate containing complexes of said complexing agent and said rare earth metals and yttrium; passing said first eluate through a second ion exchange resin charged with lower metal ions selected from the group consisting of zinc and cadmium ions so as to form lower metal complexes of said lower metal ions and said complexing agent, thereby forming a second eluate containing said lower metal complexes of said lower metal ions and said complexing agents and said rare earths and yttrium complexes; collecting successive portions of said second eluate so as to separately obtain the individual rare earths and yttrium and said lower metal complexes; acidifying the portion of said second eluate containing said lower metal complexes with an excess of at least 0.07 mol per liter of a mineral acid selected from the group consisting of sulfuric acid, hydrochloric acid and nitric acid so as to precipitate said complexing agent therefrom; and recovering said precipitated complexing agent.

9. A method of separating rare earth metals and yttrium from each other by ion exchange, comprising the steps of contacting an aqueous solution containing rare earth metal and yttrium ions with a first ion exchange resin adapted to adsorb said ions, thereby charging said ion exchange resin with adsorbed rare earth metal and yttrium ions; passing an aqueous solution of an ammonium salt of ethylenediamine tetraacetic acid as complexing agent, said aqueous solution having a pH of 8–9, through said charged ion exchange resin so as to form a first eluate containing complexes of said complexing agent and said rare earth metals and yttrium; passing said first eluate through a second ion exchange resin charged with lower metal ions selected from the group consisting of zinc and cadmium ions so as to form lower metal complexes of said lower metal ions and said complexing agent, thereby forming a second eluate containing said lower metal complexes of said lower metal ions and said complexing agents and said rare earths and yttrium complexes; collecting successive portions of said second eluate so as to separately obtain the individual rare earths and yttrium and said lower metal complexes; acidifying the portion of said second eluate containing said lower metal complexes with an excess of a mineral acid selected from the group consisting of sulfuric acid, hydrochloric acid and nitric acid so as to precipitate said complexing agent therefrom; separating said precipitated complexing agent from the remainder of said portions of said second eluate; and charging said first ion exchange resin with said remainder of said portions of said second eluate thereby recovering any rare earths and yttrium contained therein.

10. A method of separating rare earth metals and yttrium from each other by ion exchange, comprising the steps of contacting an ion exchange resin bed adapted to adsorb zinc, cadmium, rare earth metal and yttrium ions with an aqueous solution containing rare earth metal and yttrium ions and also containing lower metal ions selected from the group consisting of zinc and cadmium ions, thereby charging said ion exchange resin bed with rare earth metal and yttrium ions and with said lower metal ions; passing a solution of a complexing agent adapted to form complexes with said lower metal ions and said rare earth and yttrium and being selected from the group consisting of ethylenediamine tetraacetic acid, alkali metal and ammonium salts of ethylenediamine tetraacetic acid, nitrilotriacetic acid, hydroxyethylenediamine triacetic acid, diethylenetriamine pentaacetic acid and diaminocyclohexane tetraacetic acid through said charged ion exchange resin bed so as to form an eluate containing complexes of said complexing agent and said rare earth metal and yttrium ions and of said lower metal ions; and collecting successive portions of said eluate so as to separately obtain the individual rare earths and yttrium and said lower metal complexes.

References Cited in the file of this patent

UNITED STATES PATENTS

| | | |
|---|---|---|
| 2,798,789 | Spedding et al. | July 9, 1957 |
| 2,897,050 | Jaffe | July 28, 1959 |

OTHER REFERENCES

Schwarzenbach et al.: "Helvetica Chimica Acta," vol. 37, Tasc. 4, 1954, pages 937–957 (page 951 of particular interest).

Wheelwright: "The use of Chelating Agents in the Separation of the Rare Earth Elements by Ion-Exchange Methods," United States Atomic Energy Commission, 9SC–637, June 1955, Technical Information Extension, Oak Ridge, Tenn.

Bril: "Journal of Physical Chemistry," vol. 57, pages 874 to 879 (1953).